United States Patent [19]

Henrich et al.

[11] 4,400,183

[45] Aug. 23, 1983

[54] PROCESSES FOR SEPARATING THE NOBLE FISSION GASES XENON AND KRYPTON FROM WASTE GASES FROM NUCLEAR PLANTS

[75] Inventors: Edmund Henrich, Liedolsheim; Reinhold Hüfner; Friedhelm Weirich, both of Karlsdorf-Neuthard, all of Fed. Rep. of Germany

[73] Assignee: Kernforschungszentrum Karlsruhe GmbH, Karlsruhe, Fed. Rep. of Germany

[21] Appl. No.: 313,662

[22] Filed: Oct. 21, 1981

[30] Foreign Application Priority Data

Oct. 21, 1980 [DE] Fed. Rep. of Germany ....... 3039604

[51] Int. Cl.³ ............................................. B01D 53/16
[52] U.S. Cl. .......................................... 55/44; 55/48; 55/66; 55/73
[58] Field of Search ................... 55/44, 48, 66, 73, 89, 55/175, 208; 202/183, 184; 203/42

[56] References Cited

U.S. PATENT DOCUMENTS

| 3,404,067 | 10/1968 | Rondos | 55/66 X |
| 3,742,720 | 7/1973 | Ferguson et al. | 55/66 X |
| 3,762,133 | 10/1973 | Merriman et al. | 55/44 |
| 3,785,120 | 1/1974 | Merriman et al. | 55/48 |
| 4,115,081 | 9/1978 | Ohno et al. | 55/66 X |
| 4,129,425 | 12/1978 | Stephenson et al. | 55/44 |

*Primary Examiner*—Robert H. Spitzer
*Attorney, Agent, or Firm*—Spencer & Kaye

[57] ABSTRACT

Process for separating the noble fission gases xenon and krypton from a prepurified waste gas from a nuclear plant. The prepurified waste gas is brought into contact with liquid $Cl_2CF_2$ as an absorption agent in a first column at an operating pressure which is less than or equal to normal pressure, whereby Xe, Kr, $N_2O$, $CO_2$, $O_2$ and $N_2$ are absorbed by the agent. Subsequently, the liquid absorption agent containing the absorbed gases is heated to substantially the boiling temperature of $Cl_2CF_2$ at the operating pressure for vaporizing part of the liquid absorption agent and desorbing the absorbed Kr, $N_2$ and $O_2$ to thereby separate the Kr and Xe from one another. The desorbed Kr, $N_2$ and $O_2$ gases are separated from the vaporized absorption agent. The liquid absorption agent which has not been vaporized is treated to recover Xe, $N_2O$ and $CO_2$. Waste gas containing Kr, $N_2$ and $O_2$ from the head of the first column is brought into contact with liquid $Cl_2CF_2$ as an absorption agent in a second column, at an operating pressure which is less than or equal to normal pressure, whereby Kr, $N_2$ and $O_2$ are absorbed. Subsequently, the liquid absorption agent in the second column containing the absorbed Kr, $N_2$ and $O_2$ is heated to substantially the boiling temperature of the $Cl_2CF_2$ at the operating pressure for vaporizing part of the liquid absorption agent and desorbing the absorbed $N_2$ and $O_2$. The liquid $Cl_2CF_2$ which has not been vaporized is treated to recover Kr. An apparatus is provided for performing the process.

13 Claims, 1 Drawing Figure

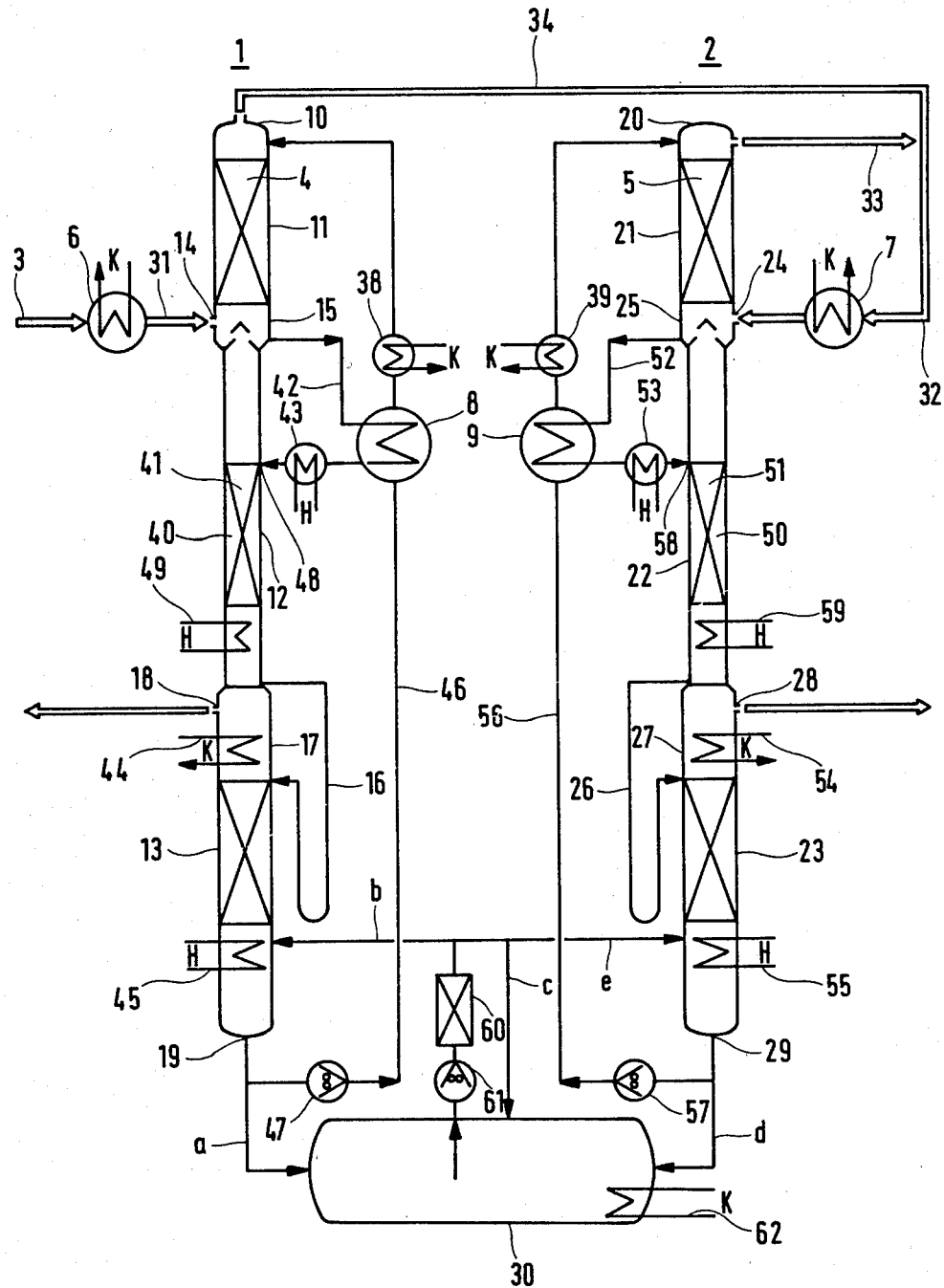

PROCESSES FOR SEPARATING THE NOBLE FISSION GASES XENON AND KRYPTON FROM WASTE GASES FROM NUCLEAR PLANTS

BACKGROUND OF THE INVENTION

The present invention relates to processes for separating the noble fission gases xenon and krypton from waste gases from nuclear plants, particularly from the dissolver exhaust gases of a reprocessing plant for irradiated nuclear fuel and/or breeder materials. The waste gas which is treated in the present invention is a prepurified waste gas which has been substantially or practically completely freed of its major contaminating components, namely aerosols, $NO_x$, $CO_2$, water vapor, iodine and $RuO_4$. The prepurified waste gas thus contains essentially only Xe, Kr, $N_2O$, $O_2$, $N_2$ as well as small quantities of $CO_2$.

Treatment of prepurified waste gas can be accomplished by bringing the prepurified gas into contact, in countercurrent, with liquid difluoro dichloro methane ($Cl_2CF_2$) as an absorption agent, whereby Xe, Kr, $N_2O$ and $CO_2$ are absorbed and small quantities of $O_2$ and $N_2$ are absorbed and are thus removed from the waste gas. The so charged liquid absorption agent is then heated to the boiling temperature of $Cl_2CF_2$ in order to evaporate part of the liquid absorption agent and to desorb an absorbed noble gas. The desorbed noble fission gas is then separated from the absorption agent vapor by condensation of this vapor. The $Cl_2CF_2$, which has now been freed from the absorbed noble fission gas and condensed, is then circulated and reused.

The present invention further relates to a column arrangement for implementing a process for separating the noble fission gases xenon and krypton from the waste gases of nuclear plants. This column arrangement comprises three column sections—upper, intermediate, and lower—which are each provided, in their mass transfer zones, with means for mass transfer. The arrangement further includes an absorption agent evaporator, a cooling device connected upstream of the column arrangement, and means for circulating the absorption agent.

Cryogenic, adsorptive, and absorptive processes have been, and are currently being developed for separating noble fission gases from the dissolver exhaust gas in reprocessing plants. Cryogenic processes have a number of disadvantages, including the fact that they operate under pressure, accumulate large quantities of fission kryptons and require complicated and expensive preliminary purification of exhaust gases. This reduces safety and operability of the cryogenic systems. The adsorptive processes also contain disadvantages, including the fact that they operate discontinuously and require extremely frequent actuation of valves which are subject to malfunction.

The development of an absorption process for the separation of noble fission gases on the plant scale is taking place only in Oak Ridge, Tenn. The process employs $Cl_2CF_2$, also known as "R-12" or "Refrigerant 12, " as the absorption agent and is disclosed in detail in German Offenlegungsschrift No. 2,831,564 which corresponds to U.S. Pat. No. 4,129,425 to Stephenson et al.

This process separates Xe and Kr together. Since the quantity of fission xenons is approximately ten times the quantity of fission kryptons, the Xe must be separated from the Kr in a further process step in order to realize an economically small, final storage volume and to commercially utilize the already inactive fission xenon.

An operating pressure up to 30 bar is used for the process.

In this process, larger quantities of contaminants are brought in. These are removed from the R-12 absorption agent by a subsequent distillation.

Due to the high operating pressure, low operating temperatures, down to about $-80°$ C. are selected.

The Kr is accumulated at a certain location in the column and is there removed continuously or discontinuously. When this process is used for the separation of the fission krypton from the dissolver exhaust gas of reprocessing systems, it has several disadvantages.

First, operation under pressure, particularly in the nuclear area, constitutes a high safety risk since a leakage may release the accumulated radioactive inventory. Expensive additional measures are therefore required to limit the safety risk. Moreover, an exhaust gas compressor is needed with this process. Regarding the introduction of contaminants, it is much more complicated to remove the contaminant from the absorption agent once introduced, for example, by means of process integrated distillation, than to freeze them out beforehand.

Although the higher than necessary operating temperature of the noble gas washers in this prior art process facilitates cooling, this is greatly overcompensated by the resulting reduction of separation selectivity, increased danger of corrosion and the costs for recovery of the evaporated R-12 from the purified waste gas. Moreover, the increased absorber operating temperature increases the circulating flow and thus the energy requirements during separation. The location in the column where the Kr accumulates and is removed depends on the operating conditions, as for example the waste gas quantity, and must be maintained at the point of discharge under fluctuating operating parameters by means of additional measuring, control and regulating devices which are subject to malfunction.

With the discontinuous discharge of the process, a somewhat higher Kr inventory accumulates between discharge periods than with a continuous discharge. Although such accumulation is low, it increases the radiolytic decomposition of the R-12, which is proportional to the Kr inventory, and which produces corrosive products, and it also increase the quantity of radioactivity that might be released in case of malfunction.

Finally, to separate the Xe from the Kr, a process has been developed which freezes out the Xe in cooling traps. This freezing process has the disadvantage of being discontinuous, and there is high contamination of the frozen Xe with radioactive fission krypton so that further purification steps are required which must be implemented under complicating and cost inefficient radiation protection measures.

SUMMARY OF THE INVENTION

It is an object of the present invention to provide a process and apparatus which enable continuous removal of noble fission gases Xe and Kr, and other contaminating gases such as $N_2O$ and $^{14}CO_2$, together, from the waste gas of nuclear plants, without the use of excessive pressure.

It is another object of the present invention to separate Xe from Kr in the waste gas of a nuclear plant, and to provide Kr in a substantially pure form.

It is another object of the present invention to avoid accumulation of large quantities of Kr, which could, in event of malfunction, lead to exposure to radiation by operating personnel or the environment.

It is another object of the present invention to provide a process which permits a reduction in costs for preliminary purification, compared to prior art processes, and which is particularly compatible with $O_2$.

It is another object of the present invention to provide a process which eliminates the need for special safety measures required with operation under pressure in prior art processes and apparatus.

It is a further object of the present invention to provide a process which permits a reduction in expenses for measuring, control, and regulating.

To achieve these objects, and in accordance with its purpose, the present invention provides an improvement in a process for separating the noble fission gases xenon and krypton from waste gases from nuclear plants, particularly from the dissolver exhaust gas of a reprocessing plant for irradiated nuclear fuel and/or breeding materials, in which a prepurified waste gas whichis substantially free of the main contaminating components, i.e. aerosols, $NO_x$, $CO_2$, water vapor, iodine, $RuO_4$, and contains essentially only Xe, Kr, $N_2O$, $O_2$, $N_2$ as well as small quantities of $CO_2$ is treated. The steps in such a process are as follows:

(a) The prepurified waste gas is brought into contact with liquid difluoro dichloromethane ($Cl_2CF_2$) as the absorption agent, whereby Xe, Kr, $N_2O$ and $CO_2$ are absorbed and small quantities of $O_2$ and $N_2$ are absorbed and thus removed from the waste gas.

(b) Subsequently, the liquid absorption agent containing the absorbed gases is heated to substantially the boiling temperature of the $Cl_2CF_2$ for vaporizing part of the liquid absorption agent and desorbing an absorbed noble fission gas, the desorbed noble fission gas being carried along by the vaporized absorption agent.

(c) The noble fission gas which is carried along by the vaporized absorption agent is separated from the vaporized absorption agent by condensation of the vapor.

(d) The $Cl_2CF_2$, which has not been freed in step (c) from the absorbed noble fission gas and condensed, is circulated and reused.

The present process provides the improvement that in step (a) Xe and Kr are absorbed at an operating pressure which is equal to or less than normal pressure; in step (b), the Xe and Kr are separated from one another at a temperature which corresponds to the boiling point of the $Cl_2CF_2$ at the operating pressure, with the Kr being desorbed and carried along by the vaporized absorption agent; in step (c) the separated Kr is recovered; and the separated Xe is desorbed and recovered.

Another aspect of the present invention provides an apparatus for separating the noble fission gases xenon and krypton from a waste gas from a nuclear plant, comprising: a first absorption column and a second absorption column, the two columns each having three column sections, upper, intermediate and lower, each section having a mass exchange zone with means for mass exchange, the apparatus further including an absorption agent evaporator, a first cooling device connected upstream of the first column and means for circulating the absorption agent, wherein (a) the first absorption column is connected in series at its head with the second essentially identically designed absorption column through the intermediary of a second cooling device, the connection being made by means of a gas line;

(b) the first absorption column is separated at the gas side at its transition between its intermediate and lower sections, and is provided with a siphon means to permit liquid flow between its intermediate and lower sections, and the second absorption column is separated at the gas side at its transition between its intermediate and lower sections, and is provided with a siphon means to permit liquid flow between its intermediate and lower sections;

(c) the first absorption column has a line for $Cl_2CF_2$, which includes a heating device, the line being disposed between the lower portion of its upper section and its intermediate section, for transfer of charged absorption agent into its intermediate section; and the second absorption column has a line for $Cl_2CF_2$, which includes a heating device, the line being disposed between the lower portion of its upper section and its intermediate section, for transfer of charged absorption agent into its intermediate section;

(d) the first absorption column has an additional heating device disposed in its intermediate section below the opening of its $Cl_2CF_2$ line into its intermediate section and below the mass exchange zone of its intermediate section; and the second absorption column has an additional heating device disposed in its intermediate section below the opening of its $Cl_2CF_2$ line into its intermediate section and below the mass exchange zone of its intermediate section;

(e) the lower section of the first absorption column is provided with a cooling device in its upper portion and a heating device above its lower end, and the lower section of the second absorption column is provided with a cooling device in its upper portion and a heating device above its lower end; and (f) the first absorption column is equipped with means for circulating absorption agent from the lower end of its lower section to the head of its upper section, which means includes a pump and at least one heat exchanger; and the second absorption column is equipped with means for circulating absorption agent from the lower end of its lower section to the head of its upper section, which means includes a pump and at least one heat exchanger.

It is to be understood that both the foregoing general description and the following detailed description are exemplary, but are not restrictive of the invention.

BRIEF DESCRIPTION OF THE DRAWINGS

The sole drawing FIGURE is a schematic representation of an embodiment of a column arrangement according to the present invention for implementing the process according to the present invention.

DETAILED DESCRIPTION OF THE INVENTION

The present invention will now be explained with reference to the drawing FIGURE, which shows a two-column apparatus, each column having three sections, upper, intermediate, and lower, equipped with means for mass exchange, such as bottoms, packings, or fill elements, in mass exchange zones. The arrangement further includes an absorption agent evaporator, a cooling device connected upstream of the column arrangement, and means for circulating the absorption agent.

The drawing FIGURE shows two substantially identical absorption columns 1 and 2. Column 1 is divided into upper, intermediate and lower sections 11, 12, and 13, respectively, and is provided with an input at point 14 in lower portion 15 of upper section 11 and an output at point 18 in upper portion 17 of lower section 13. Upper section 11 functions as an absorber section, intermediate section 12 functions as a fractionater section, and lower section 13 functions as a degasification section.

Column 2 is divided into upper, intermediate, and lower sections 21, 22, and 23, respectively, and is provided with an input at point 24 in lower section 25 of upper portion 21 and an output 28 in upper portion 27 of lower section 23. Upper section 21 functions as an absorber section, intermediate section 22 functions as a fractionater section, and lower section 23 functions as a degasification section.

Head 10 of column 1 is connected in series, by way of a gas line 34 and intermediate cooling device 7 to an input at point 24 in column 2.

A cooling device 6 is provided upstream of the input at point 14 of column 1.

Absorption column 1 is designed to be separated at the gas side of the transition between intermediate section 12 and lower section 13, that is, gas cannot flow between intermediate section 12 and lower section 13. Column 1 is provided with a siphon 16 which permits a flow of liquid from the bottom of intermediate section 12 to lower section 13. A line 42 for carrying liquid absorption agent is disposed between lower portion 15 of upper section 11 and intermediate section 12, and is equipped with a heating device 43. This line 42 transfers a charged absorption agent 41 into intermediate section 12 of column 1.

Intermediate section 12 contains a mass exchange zone 40 and line 42 is connected to the top of mass exchange zone 40 at point 48 where line 42 opens into zone 40. A heating device 49 is additionally provided in intermediate section 12 below point 48 and below mass exchange zone 40.

Upper portion 17 of lower section 13 is provided with a cooling device (reflux condenser) 44 and a heating device 45 is provided above lower end 19 of lower section 13.

Adsorption column 1 is provided with means 46 for circulating the absorption agent from the lower end 19 of lower section 13 to head 10 of upper section 11. Means 46 includes a pump 47 and at least one heat exchanger 8. An additional cooling device 38 is also provided as part of circulating means 46 between heat exchanger 8 and head 10.

In this particular advantageous embodiment of the column arrangement shown in the FIGURE, heat exchanger 8 is connected with line 42. The means 46 for circulating the absorption agent is connected to an R-12 storage tank 30 which is cooled by a cooling device 62. In order to avoid a malfunction-induced accumulation of contaminating components in the R-12 from waste gas 3 or from feed gas 31, an R-12 purification device 60 is disposed between lower section 13 and lower section 23 of second absorption column 2, and is connected, via a pump 61, to storage tank 30.

a and d are connections from the $Cl_2CF_2$ solvent inventories of column 1 and 2 to the solvent storage tank. The $Cl_2CF_2$ from the storage tank can be transferred via a pump 61 to a "purification device" 60, containing solid adsorbants to absorb impurities from the solvent. Spent solid adsorbants will be removed and replaced by fresh one. The purified solvent can be fed back either to column 1 via b, or to column 2 via e or to the storage tank via c to maintain the necessary operating inventories.

As previously stated, absorption column 2 is substantially identical to absorption column 1. Thus, absorption column 2 is designed to be separated at the gas side of the transition between intermediate section 22 and lower section 23, that is, gas cannot flow between intermediate section 22 and lower section 23. Column 2 is provided with a siphon 26 which permits a flow of liquid from the bottom of intermediate section 22 to lower section 23. A line 52 for carrying liquid absorption agent (R-12) is disposed between lower portion 25 of upper section 21 and intermediate section 22, and is equipped with a heating device 53. This line 52 transfers a charged absorption agent 51 into intermediate section 22 of column 2.

Intermediate section 22 contains a mass exchange zone 50, and line 52 is connected to the top of mass exchange zone 50 at point 58 where line 52 opens into zone 50. A heating device 59 is additionally provided in intermediate section 22 below point 58 and below mass exchange zone 50.

Upper portion 27 of lower section 23 is provided with a cooling device (reflux condenser) 54 and a heating device 55 is provided above lower end 29 of lower section 23.

Adsorption column 2 is provided with means 56 for circulating the absorption agent from the lower end 29 of lower section 23 to head 20 of upper section 21. This means 56 includes a pump 57 and at least one heat exchanger 9. An additional cooling device 39 is also provided as part of circulating means 56 between heat exchanger 9 and head 20.

In this particular advantageous embodiment of the column arrangement shown in the figure, heat exchanger 9 is connected with line 52. The means 56 for circulating the absorption agent is connected to the R-12 storage tank 30.

In an advantageous embodiment of this process, using the described apparatus, a prepurified waste gas 3 is cooled in cooler 6 to a temperature below the lowest operating temperature in the subsequent countercurrent absorption process step (for example to about 10° to 20° C. below that temperature), but above the $N_2O$ desublimation temperature.

The prepurified waste gas 3 which, during normal operation, has a temperature in the range of about $-30°$ C. to about $-60°$ C., is cooled in cooler 6, in dependence on the concentration of the $N_2O$, which must be considered to be the critical design component, to a temperature in the range of about $-90°$ C. at relatively high $N_2O$ concentration (order of magnitude 10 volume % or more) to about $-125°$ C. at about 1 volume % or less. In cooler 6 the waste gas temperature will be reduced as low as reasonably possible, but without freezing out the $N_2O$.

The cooled waste gas is introduced continuously as feed gas 31 into absorption column 1, at point 14 in lower portion 15 of upper section 11 of column 1, and is conducted in countercurrent to liquid absorption agent 4, which is $Cl_2CF_2$ (R-12), which flows downwardly from top to bottom by gravity.

The pressure in upper section 11 is maintained at an operating pressure which is equal to or less than normal pressure, it being understood that normal pressure refers to standard atmospheric pressure which is equal to 14.7 lb/sq. inch. The lower value for the operating pressure in the present invention preferably is a pressure which can be achieved economically with simple means. A preferred lower value of operating pressure is, for example, slightly below atmospheric pressure at about 0.96–0.80 bar. Preferably, the pressure throughout columns 1 and 2 is about the same neglecting the small differences, caused by the pressure drop within the column zones. The operating pressure in U.S. Pat. No. 4,129,425 is $\geq 1$ bar; the preferred pressure is $>1$ bar.

The operating pressure in the process of the invention is $\leq 1$ bar; the perferred pressure is $<1$ bar, according to safety problems during accidental release of radioactive Kr.

As a result of the countercurrent flow in upper section 11, Xe, $N_2O$ and $CO_2$ are absorbed by the agent, and Kr, $N_2$ and $O_2$ are coabsorbed by the agent. The absorbed and coabsorbed gases are transported together with the R-12 absorption agent into intermediate section 12.

The so charged R-12, which is represented by numeral 41, enters into intermediate section 12, and is heated to or near the boiling point of R-12, that is, substantially to the boiling point of R-12. First, only such portion of the R-12 liquid is vaporized as is necessary to generate in intermediate section 12 of the column a vapor/liquid volume flow ratio that is greater than the distribution coefficient Kr (gas) to Kr (liquid) in Mol/l to Mo/l and less than the distribution coefficient Xe (gas) to Xe (liquid) in Mol/l to Mol/l, whereby the coabsorbed gases Kr, $N_2$, $O_2$ are stripped (desorbed) from the charged liquid R-12 and returned with the R-12 vapor into upper section 11 and thus into the feed gas. When the R-12 vapor enters upper section 11, the R-12 vapor condenses as the result of cooling. Kr, $N_2$ and $O_2$ gases that were in the R-12 vapor are separated during the condensation of the R-12 vapor brought about by the cooling, and finally discharged at head 10 of absorption column 1 together with feed gas which has been freed of Xe, $N_2O$ and $CO_2$.

The liquid R-12 in intermediate section 12 from which Kr, $N_2O$, and $O_2$ have been stripped, is now charged only with Xe, $N_2O$ and $CO_2$, and flows through intermediate section 12 of absorption column 1. By means of siphon 16, this charged R-12 is introduced into lower section 13 which is separated on the gas side from intermediate section 12. By the further addition of heat, as by heating device 45, such portion of the liquid is converted to vapor as produces in lower section 13 of the column a vapor to liquid volume flow ratio which is greater than the distribution coefficients of Xe (gas) to Xe (liquid), $N_2O$ (gas) to $N_2O$ (liquid) and $CO_2$ (gas) to $CO_2$ (liquid), each in Mol/l to Mol/l, preferably up to an energy efficient, reasonable value. As a result, the absorbed gases Xe, $N_2O$ and $CO_2$, are stripped (desorbed) from the charged liquid R-12 and together with the R-12 vapor are brought, without accumulation, into upper portion 17 of lower section 13, the R-12 vapor is there condensed by cooling, with the aid of reflux condenser 44, causing Xe, $N_2O$ and $CO_2$ to be separated from the absorption agent, and finally removed continuously from point 18 at the head of lower section 13.

The desorbed quantities of Kr, $N_2$ and $O_2$ in upper section 11 and the feed gas, which has now been freed of Xe, $N_2O$ and $CO_2$, are removed together through head 10 of column 1 and introduced as feed gas 32 into column 2 at point 24 in lower portion 25 of upper section 21. Before introduction into column 2, the feed gas 32 is cooled in cooler 7 to a temperature corresponding to or below the temperature of cooler 6 but not below $-158°$ C., the freezing point of R-12. Feed gas 32 is conducted in countercurrent to liquid R-12 absorption agent 5, which is at the same temperature as feed gas 32, and which flows downward by gravity. As a result, Kr and small quantities of $N_2$ and $O_2$ are absorbed again into R-12 and the feed gas 32 is converted to a purified waste gas 33.

The so charged liquid R-12, which is represented by numeral 51, enters intermediate section 22 of second absorption column 2, and is heated to or nearly to the boiling temperature of R-12, that is, substantially to the boiling point of R-12. By this heating, such a portion of the liquid is converted to the vapor form which produces, in intermediate section 22 of the column, a vapor to liquid volume flow ratio which is greater than the distribution coefficient Kr (gas) to Kr (liquid) in Mol/l to Mol/l and less than the distribution coefficient $O_2$ (gas) to $O_2$ (liquid) in Mol/l to Mol/l, whereby practically the entire quantity of $N_2$ and $O_2$ is stripped (desorbed) from the charged $Cl_2CF_2$ and returned with the R-12 vapor to upper section 21 and thus into purified waste gas 33. When the R-12 vapor enters upper section 21, the R-12 vapor condenses as the result of cooling. The $N_2$ and $O_2$ gases that were in the R-12 vapor are separated from the absorption agent during the condensation of the R-12 brought about by the cooling, and finally discharged together with purified waste gas 33 at head 20 of absorption column 2.

The liquid R-12 in intermediate section 22, and which is now charged only with Kr, flows through intermediate section 22 and is introduced by means of siphon 26 into lower section 23 of absorption column 2. Lower section 23 is separated on the gas side from intermediate section 22. By the further addition of heat, as by heating device 55, such a quantity of liquid is converted to the vapor form which produces in lower section 23 of the column a vapor to liquid volume flow ratio which is greater than the distribution coefficient Kr (gas) to Kr (liquid) in Mol/l to Mol/l, preferably up to an energy efficient, reasonable value. As a result, the Kr is stripped (desorbed) from the charged liquid R-12 and is brought, without accumulation, together with the R-12 vapor into upper portion 27 of lower section 23, the R-12 vapor is there condensed by cooling, with the aid of reflux condenser 54, causing the Kr to be separated from the absorption agent, and finally discharged continuously in its pure form at point 28 at the head of the lower section 23.

The R-12 absorption agent, represented by numerals 4 and 5, is introduced into columns 1 and 2, respectively, from the respective lower ends 19 and 20 of the respective lower section 13 and 23. The agent flows to the heads 10 and 20 of the respective columns through lines 46 and 56, equipped with pumps 47 and 57. The agent flows through heat exchanges 8 and 9, in lines 46 and 56, respectively.

Charged R-12, as represented by numerals 41 and 51, is extracted from lower portions 15 and 25 of upper column sections 11 and 21, and is conducted to intermediate sections 12 and 22 through R-12 lines 42 and 52, by way of heat exchangers 8 and 9.

The process according to the present invention is suitable generally for exhaust gases which develop during the dissolution of oxidic nuclear fuel materials.

However, it can also be used for exhaust gases which are richer in $N_2O$, such as, for example, those formed during the dissolution of metallic fuels. In this case, the process conditions need to be changed somewhat. The lower the partial pressure of the $N_2O$ in the exhaust gas the lower the feed gas temperature can be made using cooler 6 without freezing the $N_2O$, the lower can the operating temperature be kept in the upper section of the absorber of the first absorption column being about 10°–20° C. higher. A further advantage of the process according to the invention is that the selective absorption in R-12 is relatively insensitive to contaminants compared to cryogenic distillation processes, and that the process conditions reduce the sensitivity to irregularities in the course of the process. By cooling the waste gas before it enters into the absorber, the quantities of freezable gas components are reduced to such an extent that defrost cycles of 100 hours or more become possible. Malfunctions in the absorption processes can be corrected by shortening the cycle times which results in additional on line redundance.

The following examples are given by way of illustration to further explain the principles of the invention. These examples are merely illustrative and are not to be understood as limiting the scope and underlying principles of the invention in any way. All percentages referred to herein are by volume unless otherwise indicated.

EXAMPLE

For the implementation of the experiment, a column arrangement of laboratory scale was used, which was substantially as shown in the Figure. For preparation, an operating inventory of 4 liters of commercial R-12 was initially condensed into R-12 storage tank 30, and was purified at temperatures a few degrees below the normal pressure boiling point of R-12 by circulating it for about one day and conducting it through a molecular sieve bed (not shown in the drawing). The prepurified operating inventory of almost 2 liters of R-12 was fed into each one of the precooled absorption columns (noble gas washers) 1 and 2 which had been cleaned by rinsing with nitrogen. Circulating pumps 47 and 57, which were magnetically coupled gear pumps, were set with the aid of rotation meters (not shown in the drawing) to a circulating flow of 4 liters per hour. This value still assured a sufficient interval from the flood point of the columns.

Heat exchangers 8 and 9, continuous flow heaters 43, 53, 49, 59, 45, and 55, and cooling devices 6, 7, 38, 39, 44 and 54 were then put into operation. Cooling device 62 had been in operation from the beginning. Until the desired temperature equilibriums had been attained, the circulation was regulated and then kept constant for the duration of the several days of the experiment. The fluctuations observed on the rotation meter were ±0.5 liter per hour. The electrical heating energy of the continuous flow heaters in intermediate column sections 12, 22, i.e. in the fractionator zones, was calculated from the circulating flow and from the known evaporation heat of R-12 under consideration of the insulation losses (the insulation of the column was not optimum; 6 to 16 cm solid polyurethane foam were used as casing) and was set by means of a watt meter (not shown in the drawing), to be easily readjusted during the subsequent experimental operation under a gas load (implementation of the process according to the invention) with the aid of the gas chromatographically measured composition of the separated xenon and krypton raw products and the purified gas side.

Instead of a genuine waste gas 3, a simulated feed gas 31 was used, which consisted, at the beginning, of so-called synthetic air, air without a $CO_2$ component. Once the system had been regulated to constant operating conditions, $CO_2$-containing ambient air to which had been added various quantities of xenon, krypton or $N_2O$, respectively, was used as the simulated feed gas. The flow was measured separately for each gas component by means of a rotation meter (not shown in the drawing). The accuracy of the total flow was about ±5%. The total feed gas flow was 120 normal liters per hour and contained a maximum of 3 volume percent xenon, 3 volume percent krypton, 3 volume percent $N_2O$ and a maximum of 350 VPM (parts per million by volume) $CO_2$. Noble gases, $N_2O$ and $CO_2$ (ambient air) were fed in only after the system had been regulated to constant operating conditions with the synthetic air.

Before entering column 1, which served as a xenon washer, feed gas 31 was cooled to −90° C. in a snake cooler so as to remove freezable contaminants. Then, feed gas 31 was introduced at point 14 in lower portion 15 of the absorber section 11 and brought into contact, in countercurrent, in the packed absorber 11 with downwardly flowing R-12 absorption agent 4, which becomes charged. The charged agent, which is represented by numeral 41, and which was now charged mainly with xenon, $N_2O$ and $CO_2$, was extracted from column 1 at the lower end of absorber section 11 and removed by means of R-12 line 42, which included heat exchanger 8 and heating device 43, and was reintroduced into fractionator section 12 at point 48. The average temperature in the absorber 11 was −80° C. ±6° C. By heating the charged R-12 in heat exchanger 8 and in heating device 43, as well as by the heating energy from heating device 49 below packing 40 in fractionator section 12, the average temperature in fractionator section 12 rose to −30°±1° C. The heating output of device 49 was set in such a way that a net boiling rate of 3±1% of the circulating flow was evaporated from the R-12 and the remaining quantities of Kr, $N_2$ and $O_2$ were desorbed from the charged R-12 and separated. Practically all of the krypton, $N_2$ and $O_2$ were thus transferred to absorption column 2, the krypton washer.

The R-12, which was now charged only with xenon, $N_2O$ and $CO_2$, was conducted into degasification section 13 at the lower end of fractionator section 12 and in the packed portion of degasification section 13 was brought into contact, in countercurrent, with the R-12 vapor which was generated with the aid of heating device 45, at a net boiling rate of 15±2% of the circulating flow of R-12. The R-12 vapor stripped the Xe, $N_2O$ and $CO_2$ out of the liquid, i.e. the gases were desorbed, were cooled in upper portion 17 of degasification section 13 with the aid of cooling device 44, and were removed from xenon washer 1 at point 18 at the head of degasification section 13.

The production of pure xenon gas from the output gases which were removed at point 18 can be effected in a known manner by freezing out the $CO_2$ and $N_2O$ mixed therewith. Alternatively, the $CO_2$ can be washed out of the xenon with the aid of an NaOH solution until concentrations of far below 1 vpm are realized in the xenon.

The R-12 arriving at lower end 19 of degasification section 13 was circulated back to head 10 of absorber section 11 via pump 47 and line 46, flowing through heat exchanger 8 and cooling device 38, and was reused.

In order to realize a defined operation of column 2, which served as a krypton washer, which has the same dimensions as column 1, at the set absorber temperature of $-85°$ C., only roughly 20 to 25% of the gas freed of xenon, $N_2O$ and $CO_2$ from xenon washer 1 could be fed in. This, however, was the result only of the small dimensions of the laboratory column arrangement, and is not a problem of the process in general. The entire gas quantity could be handled in column 2 in a simple manner, by appropriately lowering the absorber temperature in column 2 or by increasing the size of column 2 and thus the circulating flow and the heating energy. Feed gas 32 for krypton washer 2 was introduced, after cooling to $-85° \pm 5°$ C. in cooling device 7, at point 24 in lower portion 25 of absorber section 21, and was conducted in countercurrent to liquid R-12 absorption agent 5 through the packed absorber section 11 causing krypton and a small quantity of $N_2$ and $O_2$ to be absorbed. At the head of absorber section 21, freed waste gas 33 (purified gas) was extracted and conducted into a chimney (not shown in the drawings).

Charged absorption liquid 51 was extracted from lower portion 25 of absorber section 21 and introduced into fractionator section 22 at point 58 with the aid of line 52 equipped with heat exchanger 9 and heating device 53. The separation of the remainder of $N_2$ and $O_2$ from the krypton was effected in fractionator section 12 by means of R-12 vapor which was generated by heating device 59 below packing 50 in fractionator section 22. The absorption of krypton in the liquid R-12 remained in effect in fractionater section 12 and the liquid R-12 was transported with the aid of siphon 26 from the lower part of fractionator section 22 to degasification section 23. With proper operation, a net boiling rate of $0.9 \pm 0.5\%$ of the circulating flow of R-12 was obtained in fractionator section 22. For desorption and recovery of the krypton, R-12 vapor was generated in the lower portion of packed degasifier section 23 at a net boiling rate of $6 \pm 2\%$ of the circulating flow. The R-12 vapor in degasifier section 12 stripped the krypton from the liquid in degasifier section 12. The stripped krypton and the R-12 vapor are cooled by device 24, resulting in the condensation of the R-12 vapor and separation of the stripped krypton which was then discharged in practically pure form in upper portion 27 of degasifier 23 at point 28 in the head of the degasifier.

The standard deviations, as stated herein, are the result of the correction of the gross heating power set at the watt meter (not shown in the drawing) in view of the heat transfer through the insulation which in the experiment could not be defined with great accuracy. Inter alia, a relatively long time was required to set the temperature equilibrium in the insulation.

The operating conditions and the test results are compiled in the following table.

|  |  | Xenon Washer (1) | Krypton Washer (2) |
|---|---|---|---|
| Operating Conditions |  |  |  |
| Average temperature in °C. | absorber | $-80 \pm 6$ | $-85 \pm 5$ |
|  | fractionator | $-30 \pm 1$ | $-30 \pm 1$ |
|  | degasifier | $-30 \pm 1$ | $-30 \pm 1$ |
| Operating Pressure |  | 745 mm Hg | |
| R-12 circulating flow l/h |  | $4 \pm 0.5$ | $4 \pm 0.5$ |
| Feed gas inflow Nl/h |  | $120 \pm 6$ | $25 \pm 3$ |
| Feed gas composition | Xe | 3 vol. % | |
| (measured values) | Kr | 3 vol. % | |
| difference - ambient air | $N_2O$ | 3 vol. % | |
|  | $CO_2$ | 350 vpm | |
| boiling rate % | fractionator | $3 \pm 1$ | $0.9 \pm 0.5$ |
| of the circulating flow | degasifier | $15 \pm 2$ | $6 \pm 2$ |
| Column design |  |  |  |
| Diameter (absorber, fractionator, degasifier) |  | inner diameter 25 mm | |
| Length (absorber, fractionator, degasifier) |  | 2 × 450 mm with return distributor | |
| Packings (absorber, fractionator, degasifier) |  | 2 × 2 mm wire coil of stainless steel | |
| Heating (absorber, fractionator, degasifier) |  | annular gap continuous flow heater, electrical resistance heating in the inner core | |
| Cooler, (absorber, fractionator, degasifier) heat exchanger |  | product cooler type Liebig-Kuhler, otherwise coil cooler | |
| Siphons |  | Inflow difference outlet/inlet | |
| R-12 storage tank |  | 600 mm provided with cooling devices (62) | |
|  |  | Analysis values[1] | |
|  |  | Gas Leaving Head 10 | Gas Leaving Head 20 |
| purified gas (purified gas leaving head 10 of Xe washer 1 is the same as the raw or feed gas entering the KR washer at 24) | Xe | <100 vpm | <100 vpm |
|  | Kr | 3 vol. % | <100 vpm |
|  | $N_2O$ | <100 vpm | <100 vpm |
|  | $CO_2$[2] | <1 vpm | <1 vpm |
|  | R-12 | 7 vol. % | 5 vol. % |
|  |  | Gas Leaving Output 18 | Gas Leaving Output 28 |
| product[3] | Xe | 93 vol. % | <100 vpm |
|  | Kr | <100 vpm | >90 vol. % |
|  | $N_2O$ | — | — |
|  | $CO_2$ | — | — |
|  | R-12 | 7 vol. % | 4 vol. % |

[1] Samples were taken by means of "gas mice", the gas chromatographic analysis did not permit $N_2/O_2$ separation. Occasional air contained in the Xe products was the result of leakages and was not considered in the calculations of the average.
[2] Determination by absorption in an alkali washer.
[3] Product analyses were made in the experimental operation only in the presence of Kr and Xe.

This results in a deco factor (DF) (decontamination factor) of >300 for Xe in the xenon washer and a separating factor Xenon/Kr of roughly $10^4$. The Kr washer likewise has a DF for Kr of >300. Malfunctions due to frozen contaminants were not observed during more than $10^2$ hours of operation.

It is understood that the above description of the present invention is susceptible to various modifications, changes and adaptions, and the same are intended to be comprehended within the meaning and ranges of equivalents of the appended claims.

What is claimed is:

1. In a process for separating the noble fission gases xenon and krypton from a prepurified waste gas from a nuclear plant, the prepurified waste gas being substantially free of the main contaminating components, namely, aerosols, $NO_x$, $CO_2$, water vapor, iodine and $RuO_4$ and consisting essentially of Xe, Kr, $N_2O$, $O_2$, $N_2$ and small quantities of $CO_2$, wherein:

(a) the prepurified waste gas is brought into contact with liquid $Cl_2CF_2$ as an absorption agent, whereby Xe, Kr, $N_2O$ and $CO_2$ are absorbed by the agent and small quantities of $O_2$ and $N_2$ are absorbed and thus removed from the waste gas;

(b) subsequently the liquid absorption agent containing the absorbed gases is heated to substantially the boiling temperature of $Cl_2CF_2$ for vaporizing part of the liquid absorption agent and desorbing an absorbed noble fission gas, the desorbed noble fission gas being carried along by the vaporized absorption agent;

(c) the noble fission gas which is carried along by the vaporized absorption agent is separated from the vaporized absorption agent by condensation of said vapor; and (d) the $Cl_2CF_2$, which has been freed in step (c) from the absorbed noble fission gas and condensed, is circulated and reused; the improvement comprising:

in step (a), absorbing Xe and Kr in liquid $Cl_2CF_2$ at an operating pressure equal to or less than normal pressure;

in step (b), separating the Xe and Kr from one another at a temperature which corresponds substantially to the boiling point of $Cl_2CF_2$ at said operating pressure, with the Kr being desorbed and carried along by the vaporized absorption agent;

in step (c), recovering the separated Kr; and desorbing and recovering the separated Xe.

2. Process as defined in claim 1, wherein (e) the prepurified waste gas is cooled in a first cooler to a temperature below the lowest operating temperature of said step (a), but above the $N_2O$ desublimation temperature;

(f) the cooled waste gas of step (e) is introduced continuously in step (a) as feed gas into a first absorption column, which is divided into three sections, upper, intermediate and lower, at a point in the lower portion of the upper section, and is conducted in countercurrent to said liquid absorption agent which flows downwardly as a result of gravity, whereby Xe, $N_2O$ and $CO_2$ are absorbed and a small fraction of Kr, $N_2$ and $O_2$ are coabsorbed to charge the $Cl_2CF_2$, and the charged $Cl_2CF_2$ is transported into the intermediate section of the first absorption column;

(g) the charged $Cl_2CF_2$ entering into the intermediate section of the first absorption column is heated substantially to the boiling point of $Cl_2CF_2$ to vaporize such a portion of the $Cl_2CF_2$ liquid which generates in the intermediate section of the column a vapor to liquid volume flow ratio which is greater than the distribution coefficient of Kr (gas) to Kr (liquid) in MOl/l to Mol/l, and less than the distribution coefficient Xe (gas) to Xe (liquid) in Mol/l to Mol/l, whereby the coabsorbed gases Kr, $N_2$, $O_2$ are stripped from the charged $Cl_2CF_2$ and returned with the $Cl_2CF_2$ vapor into the upper section and into the feed gas, the $Cl_2CF_2$ vapor which enters the upper section being condensed as the result of cooling, and the Kr, $N_2$ and $O_2$ which is in the $Cl_2CF_2$ vapor being separated from the absorption agent during the condensation of the $Cl_2CF_2$ vapor brought about by the cooling;

(h) the liquid $Cl_2CF_2$ in the intermediate section from which Kr, $N_2\phi$ and $O_2$ have been stripped, and which is charged only with Xe, $N_2O$ and $CO_2$ flows through the intermediate section of the first absorption column, and is introduced via a siphon into the lower section, the lower section being separated from the intermediate section at the gas side; such part of the liquid introduced into the lower section is converted to the vapor form by the addition of heat that in the lower section of the column, a vapor to liquid volume flow ratio is produced which is greater than the distribution coefficient of Xe (gas) to Xe (liquid), $N_2O$ (gas) to $N_2O$ (liquid) and $CO_2$ (gas) to $CO_2$ (liquid) each in Mol/l to Mol/l, so that the absorbed gases Xe, $N_2O$ and $CO_2$ are stripped from the liquid and together with the $Cl_2CF_2$ vapor are brought, without accumulation, into the upper portion of the lower section of the first column, the $Cl_2CF_2$ vapor is there condensed by cooling, whereby Xe, $N_2O$ and $CO_2$ are separated from the absorption agent, and finally discharged continuously at the head of the lower section;

(i) the desorbed and separated Kr, $N_2$ and $O_2$ of step (g) and the feed gas of step (f) which has been freed of Xe, $N_2O$ and $CO_2$ are removed together through the head of the first absorption column and cooled in a second cooler to a temperature which is about equal to or less than that of said first cooler, and are then introduced into a second absorption column, which is divided into three sections, upper, intermediate and lower, at a point in the lower portion of the upper section, and are conducted in countercurrent to liquid $Cl_2CF_2$ absorption agent which is at about the same temperature, whereby Kr and small quantities of $N_2$ and $O_2$ are absorbed to charge the liquid $Cl_2CF_2$ and to form a purified waste gas, the absorbed gases are transported together with the $Cl_2CF_2$ into the intermediate section of the second absorption column;

(j) the charged $Cl_2CF_2$ entering into the intermediate section of the second absorption column is heated substantially to the boiling temperature of the $Cl_2CF_2$ to vaporize such part of the liquid which produces in the intermediate section of the column a vapor to liquid volume flow ratio which is greater than the distribution coefficient Kr (gas) to Kr (liquid) in Mol/l to Mol/l and less than the distribution coefficient $O_2$ (gas) to $O_2$ (liquid) in Mol/l to Mol/l, whereby substantially the entire quantity of $N_2$ and $O_2$ is stripped from the charged $Cl_2CF_2$ and returned, together with the $Cl_2CF_2$ vapor into the upper second column into the purified waste, the $Cl_2CF_2$ vapor which enters the upper section being condensed as a result of cooling, and the $N_2$ and $O_2$ which are in the $Cl_2CF_2$ vapor being separated from the absorption agent during the condensation of the $Cl_2CF_2$ vapor brought about by the cooling, and finally discharged together with purified waste gas at the head of the second column; and (k) the liquid $Cl_2CF_2$ in the intermediate section of the second column from which $N_2$ and $O_2$ have been stripped and which is now charged only with Kr, flows through the intermediate section of the second column, and is introduced via a siphon into the lower section of the second absorption column, which is separated from the intermediate section of the second column at the gas side, converting such part of the liquid to vapor form by addition of heat, that in the lower section of the second column a vapor to liquid volume flow ratio is produced which is greater than the distribution coefficient Kr (gas) to Kr (liquid) in Mol/l to Mol/l, so that the Kr is stripped from the liquid $Cl_2CF_2$ and brought together with the $Cl_2CF_2$ vapor, without accumulation, into the upper portion of the lower section of the second column, the $Cl_2CF_2$ is there condensed by cooling, whereby Kr is separated from the absorption agent, and finally discharged continuously in pure form at the head of the lower section of the second column.

3. Process as defined in claim 1 or 2, wherein the prepurified waste gas is cooled in the cooler from a temperature in the range from about $-30°$ C. to about $-60°$ C. a temperature determined in dependence on the concentration of the $N_2O$ in the gas which is in the range of about $-90°$ C. to about $-125°$ C.

4. Process according to claim 3, wherein the prepurified waste gas is cooled to a temperature of about $-90°$ C. for a relatively high $N_2O$ concentration.

5. Process as defined in claim 2, wherein the $Cl_2CF_2$ in the first column is circulated, from the lower end of the lower section of the first column through a heat exchanger to the head of the first column, and the $Cl_2CF_2$ in the second column is circulated, from the lower end of the lower section of the second column through a heat exchanger to the head of the second column.

6. Process as defined in claim 2, wherein the charged $Cl_2CF_2$ in the first column is extracted from the lower portion of the upper section of the first column, and conducted through a line through a heat exchanger to the intermediate section of the first column, and the charged $Cl_2CF_2$ in the second column is extracted from the lower portion of the upper section of the second column, and conducted through a line through a heat exchanger to the intermediate section of the second column.

7. Process according to claim 1 or 2, wherein said waste gases are from the dissolver exhaust gas of a reprocessing plant for irradiated nuclear fuel and/or breeding materials.

8. Process according to claim 1 or 2, wherein the krypton and xenon are absorbed at $-0.8$ to $0.96$ bar.

9. Apparatus for separating the noble fission gases xenon and krypton from a waste gas from a nuclear plant, comprising: a first absorption column and a second absorption column, the two columns each having three column sections, upper, intermediate and lower, each section having a mass exchange zone with means for mass exchange, the apparatus further including absorption agent evaporators, a first cooling device connected upstream of the first column and means for circulating the absorption agent, wherein
(a) the first absorption column is connected in series at its head with the second essentially identically designed absorption column through the intermediary of a second cooling device, the connection being made by means of a gas line;
(b) the first absorption column is separated at the gas side at its transition between its intermediate and lower sections, and is provided with a siphon means to permit liquid flow between its intermediate and lower sections, and the second absorption column is separated at the gas side at its transition between its intermediate and lower sections, and is provided with a siphon means to permit liquid flow between its intermediate and lower sections;
(c) the first absorption column has a line for $Cl_2CF_2$, which includes a heating device, the line being disposed between the lower portion of its upper section and its intermediate section, for transfer of charged absorption agent into its intermediate section, and the second absorption column has a line for $Cl_2CF_2$, which includes a heating device, the line being disposed between the lower portion of its upper section and its intermediate section, for transfer of charged absorption agent into its intermediate section;
(d) the first absorption column has an additional heating device disposed in its intermediate section below the opening of its $Cl_2CF_2$ line into its intermediate section and below the mass exchange zone of its intermediate section; and the second absorption column has an additional heating device disposed in its intermediate section below the opening of its $Cl_2CF_2$ line into its intermediate section and below the mass exchange zone of its intermediate section;
(e) the lower section of the first absorption column is provided with a cooling device in its upper portion and with a heating device above its lower end; and the lower section of the second absorption column is provided with a cooling device in its upper portion and with a heating device above its lower end; and
(f) the first absorption column is equipped with means for circulating absorption agent from the lower end of its lower section to the head of its upper section, which means includes a pump and at least one heat exchanger; and the second absorption column is equipped with means for circulating absorption agent from the lower end of its lower section to the head of its upper section, and which means includes a pump and at least one heat exchanger.

10. Apparatus as defined in claim 9, wherein the heat exchanger for the first column is connected with the $Cl_2CF_2$ line for the first column, and the heat exchanger for the second column is connected with the $Cl_2CF_2$ line for the second column.

11. Apparatus as defined in claim 9 additionally comprising a $Cl_2CF_2$ storage tank which is connected to the means for circulating the absorption agent for the first absorption column and to the means for circulating the absorption agent for the second absorption column.

12. Apparatus in claim 11 wherein a $Cl_2CF_2$ purification device is disposed between the lower sections of each column and is connected with the storage tank in order to avoid malfunction-induced accumulation of contaminating components in the $Cl_2CF_2$.

13. A process for separating the noble fission gases xenon and krypton from a prepurified waste gas from a nuclear plant, the prepurified waste gas being substantially free of the main contaminating components, namely, aerosols, $No_x$, $CO_2$, water vapor, iodine and $RuO_4$ and consisting essentially of Xe, Kr, $N_2O$, $O_2$, $N_2$ and small quantities of $CO_2$, comprising:

(a) bringing the prepurified waste gas into contact with liquid $Cl_2CF_2$ as an absorption agent in a first column at an operating pressure which is less than or equal to normal pressure, whereby Xe, Kr, $N_2O$ and $CO_2$ are absorbed by the agent and small quantities of $O_2$ and $N_2$ are absorbed and thus removed from the waste gas;

(b) subsequently, heating in the fisrt column the liquid absorption agent containing the absorbed gases to substantially the boiling temperature of $Cl_2CF_2$ at the operating pressure for vaporizing part of the liquid abbsorption agent and desorbing the absorbed Kr, $N_2$ and $O_2$ gases, the desorbed Kr, $N_2$ and $O_2$ gases being carried along by the vaporized absorption agent to the prepurified waste gas, to thereby separate the Kr and Xe from one another;

(c) separating the desorbed Kr, $N_2$ and $O_2$ gases which are carried along by the vaporized absorption agent from the vaporized absorption agent by condensation of said vapor;

(d) vaporizing a part of the liquid absorption agent which has not been vaporized in step (b) and which contains Xe, $N_2O$ and $CO_2$, and from which Kr, $N_2$ and $O_2$ have been desorbed, to desorb the Xe, $N_2O$ and $CO_2$, with the desorbed Xe, $N_2O$ and $CO_2$ gases being carried along by the vaporized absorption agent;

(e) separating the desorbed Xe, $N_2O$ and $CO_2$ from the vaporized absorption agent by condensation of the vapor;

(f) removing the desorbed Xe, $N_2$ and $O_2$ gases from the head of the first column and bringing them, as feed gas, into contact with liquid $Cl_2CF_2$ as an absorption agent in a second column, at an operating pressure which is less than or equal to normal pressure, whereby Kr, $N_2$ and $O_2$ are absorbed;

(g) subsequently, heating in the second column the liquid absorption agent containing the absorbed Kr, $N_2$ and $O_2$ to substantially the boiling temperature of the $Cl_2CF_2$ at the operating pressure for vaporizing part of the liquid absoprtion agent and desorbing the absorbed $N_2$ and $O_2$, the desorbed $N_2$ and $O_2$ gases being carried along by the vaporized absorption agent to the feed gas for the second column;

(h) vaporizing a part of the liquid $Cl_2CF_2$ which has not been vaporized in step (g) and which contains Kr and from which $N_2$ and $O_2$ have been desorbed, to desorb the Kr, with the desorbed Kr being carried along by the vaporized absorption agent; and (i) separating the desorbed Kr of step (h) from the vaporized $Cl_2CF_2$ by condensation of the vapor.

* * * * *